UNITED STATES PATENT OFFICE.

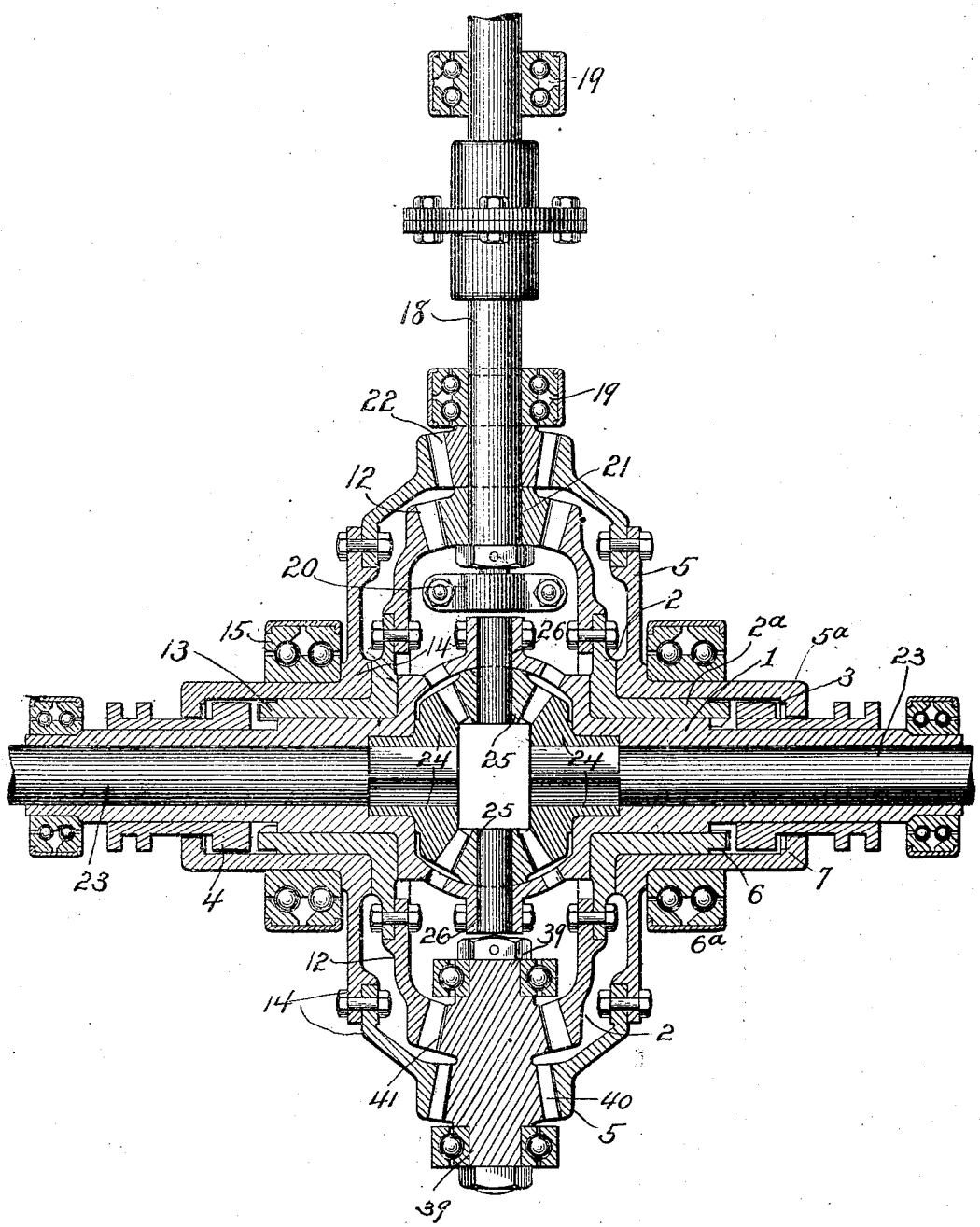

DENNIS P. COLLINS, OF PITTSBURGH, PENNSYLVANIA.

SPEED-CHANGING AND TRANSMISSION GEARING.

1,033,082.

Specification of Letters Patent. Patented July 23, 1912.

Application filed December 29, 1910. Serial No. 599,966.

*To all whom it may concern:*

Be it known that I, DENNIS P. COLLINS, of Pittsburgh, in the county of Allegheny and State of Pennsylvania, have invented certain new and useful Improvements in Speed-Changing and Transmission Gearing; and I do hereby declare the following to be a full, clear, and exact description of the invention, such as will enable others skilled in the art to which it appertains to make and use the same.

My invention relates to an improvement in speed changing and transmission gearing, and it consists in the parts and combination of parts as will be more fully explained and pointed out in the claims.

The accompanying drawing is a view partly in elevation of my improved gearing.

1 represents the rear axle sleeve which carries the driven gears of the series. The portions of the sleeve that are embraced by the sliding clutches 3 and 4 are angular in cross section, while the remaining portions are cylindrical and form bearings for the several driven gears.

Loosely mounted on a cylindrical portion of the sleeve 1 is the reverse gear 2, and mounted to rotate on the hub 2ª of the latter is the larger reverse gear 5, the hub 5ª of which overhangs the hub of gear 2. The outer ends of hubs 2ª and 5ª are provided respectively with clutch teeth 6 and 7 with which the teeth of the sliding clutch 3 mesh. The clutch has an angular bore conforming in size and shape to the angular portion of the sleeve 1, and is adapted to slide thereon between the teeth 6 and 7 of the hubs of gears 2 and 5 and lock either gear to the sleeve. The hub or body of the clutch 3 projects beyond the end of the hub 5ª as shown so as to be engaged by suitable clutch actuating devices. Hub 5ª is mounted in and supported by the roller bearing 6ª, which latter operates to hold the gear 5 in its position to be engaged by the drive pinions on the drive shaft. In the drawing the clutch 3 is shown disengaged from the teeth of both hubs, and when so disengaged the gears run loosely on the shaft when the driving shaft is rotating.

Loosely mounted on a cylindrical portion of sleeve 1, is the fast speed gear 12, and mounted on the hub 13 of the latter is the hub of slow speed gear 14. This hub of the slow speed gear is also mounted in the anti-friction bearing 15, and is provided at its outer end with inwardly projecting clutch teeth adapted to be engaged by the teeth of clutch 4. The hub 13 of the fast speed gear is also provided at its outer end with outwardly projecting teeth adapted to be engaged by teeth on the clutch 4. The clutch sleeve projects through the outer end of the hub of the slow speed gear 14, so as to be engaged by suitable clutch actuating devices. This clutch 4 is so constructed that the teeth thereof may rest in a neutral position between the clutch teeth of the speed gears 12 and 14, and when so placed both gears will run loosely on their respective bearings. By shifting the clutch 4 outwardly toward the slow speed gear, the latter will be locked to the sleeve and by now moving the clutch to the right, or toward the fast speed gear, the slow speed gear will be disconnected from the sleeve, and by continuing the movement of the clutch to the right, the fast speed gear will be clutched to the sleeve.

The reverse gear 5 and the slow speed gear 14 are of the same size, and the fast speed gear and reverse gear 2 are of the same size, and are located between and are concealed by the gears 5 and 14. By the construction shown, the smaller gears of each set are supported against outward displacement by the larger gears and the latter are similarly supported by the anti-friction bearings.

18 is a drive shaft mounted in the anti-friction bearings 19, and supported at its inner end against a thrust bearing 20 carried by a suitable housing. This shaft is supported by one or more of the anti-friction bearings 19, and is provided with two fixed bevel pinions 21 and 22, the former of which is larger than pinion 22, and meshes with the fast speed gear 12 and also with the reverse gear 2, while the smaller pinion 22 meshes with the reverse gear 5 and also with the slow speed gear 14. It will therefore be seen that the speed and reverse gears are directly driven, and all rotate when the driving shaft 18 is rotating.

The sleeve 1 is hollow for the passage of the sections 23 of the axle, and each axle section is provided at its inner end with a bevel pinion 24 both of which are in engagement with the bevel pinion 25 mounted on the journals 26 carried by the sleeve 1. The interior of the sleeve is enlarged in line with the driving shaft, for the reception of this differential gearing 24 and 25, and is made in two sections joined at such enlarged portion, hence when the differential gears are assembled, and the two sections of the sleeve secured together, the gears and their axles will be secured against the possibility of longitudinal displacement.

Mounted on the pintle 39 fixed to the housing or other support, or integral with such pinion which may be mounted in bearings carried by the housing, are the secondary drive or idle pinions 40 and 41, the former of which meshes with the gears 5 and 14 while the latter meshes with the gears 2 and 12 and operates to maintain the two sets of gears in positive alinement with the driving pinions and thus eliminate to a large extent the noise incidental to the springing apart of these gears at the pitch line when the power is applied. Again by this arrangement increased strength is obtained due to the fact that power is applied to the driven gears at diametrically opposite points, and in the event the teeth of any one of the gears or pinions should be broken off, the power would be transmitted to the clutched gears by the remaining gears and pinions. Thus, if gear 14 were locked to the sleeve and pinion 22 should be disabled, the fast speed forward gears 12 and fast speed reverse gear 2, will be rotated by pinion 21, and as these gears are in mesh with idle pinion 41, and the latter integral with idle pinion 40, meshing with gear 14, the latter will be positively driven by the idle pinion.

This improvement is designed particularly for use on railroad cars operated by gasolene or other similar fuel, and also for automobiles, but it can be used with any kind of motor and on any machine or vehicle employing changeable speed and reverse transmission gearing.

Having fully described my invention what I claim as new and desire to secure by Letters-Patent, is:—

1. The combination with a driving sleeve, two sets of oppositely disposed gears mounted on said sleeve, and a clutch for each set of gears, of a drive shaft, two pinions thereon, each pinion meshing with one gear of each set and two connected idle pinions each meshing with one gear of each set.

2. The combination with a driving sleeve, two sets of oppositely disposed gears mounted on said sleeve, the two sets of gears facing each other, and a clutch for each set of gears, of a drive shaft, pinions fixed thereto, each pinion meshing with one gear of each set and a set of connected idle pinions disposed opposite the drive pinions, each idle pinion meshing with one gear of each set.

3. The combination with two sets of oppositely disposed gears arranged in pairs, the gears of each set being of different diameters, and the gears of each pair being of the same diameter, and clutches for each set of gears, of a drive shaft, a pinion thereon for each pair of gears and meshing with same and a series of connected idle pinions, each idle pinion meshing with a pair of gears.

4. The combination with a sleeve a section shaft therein and differential gearing connecting the sleeve and two sections of the shaft, of two sets of oppositely disposed gears loosely mounted on the sleeve, the said gears being arranged in pairs, a clutch for each set of gears, a drive shaft, a pinion thereon for each pair of gears and connected idle pinions, each meshing with a pair of gears.

5. The combination with a member to be driven, a plurality of forward drive gears and a reverse gear thereon, and clutches for locking the several gears to said member, of a drive shaft, a plurality of pinions thereon, each meshing with one of the forward drive gears and one also meshing with a reverse gear, and a plurality of connected idle pinions, each meshing with one forward drive gear and one of them also meshing with the reverse gear.

6. The combination with axle sections, a sleeve mounted thereon and means connecting the sleeve and axle sections, of a plurality of forward drive gears and a reverse gear on said sleeve, clutches for locking the several gears to the sleeve, a drive shaft, a plurality of connected pinions thereon each meshing with one of the forward drive gears and one also meshing with the reverse gear, and a plurality of connected idle pinions, each meshing with one of the forward drive gears and one of them also meshing with the reverse gear.

7. The combination with a driving sleeve, two sets of oppositely disposed gears mounted on said sleeve, and a clutch for each set of gears, of a drive shaft, two pinions thereon, each pinion meshing with one gear of each set, and two idle pinions each meshing with one gear of each set.

8. In apparatus of the class described, a driving shaft, an axle or shaft to be driven, a pair of driving pinions of different size connected with the driving shaft, a pair of gears meshing with the pinions, a second pair of pinions similar to the first meshing with the said gears, and a third gear meshing with one of the pinions of each pair and means for connecting the gears with the shaft to be driven, each of said pinions and gears being utilized to transmit power at all times.

9. In apparatus of the class described, a driving shaft, an axle or shaft to be driven, a pair of driving pinions of different size connected with the driving shaft, a pair of gears meshing with the pinions, a second pair of pinions similar to the first meshing with the said gears, and a third gear meshing with one of the pinions of each pair and means for connecting the gears with the shaft to be driven, each of said pinions and gears being utilized to transmit power at all times, said second pair of pinions being arranged at a point diametrically opposite the first pair of pinions.

10. In apparatus of the class described, a drive shaft, an axle or shaft to be driven, a pair of pinions of different size connected with the drive shaft, a casing, a high and low speed gear bearing in the casing, a reversing gear having a bearing in the casing and meshing with one of the pinions, means for connecting the gears to the driven shaft or axle, and a second pair of pinions mounted in the casing and meshing one with the high speed gear and the other with the low speed and reversing gear.

11. In combination in apparatus of the class described, a drive shaft, a driven shaft or axle, a pair of pinions connected with the drive shaft to move in unison, said pinions being of different size, a pair of gears meshing with the said pinions, means for clutching either gear to the driven shaft or axle, and a second pair of pinions connected to move in unison and meshing with the said gears.

12. The combination with an axle, a plurality of oppositely disposed gears, and clutches, of a drive shaft, a series of rigidly connected main drive pinions meshing with the oppositely disposed gears, and connected secondary drive pinions also meshing with said gears whereby each gear assists in driving the other.

In testimony whereof, I have signed this specification in the presence of two subscribing witnesses.

DENNIS P. COLLINS.

Witnesses:
W. T. MARTERSTEEK,
G. H. GERDING.

---

Copies of this patent may be obtained for five cents each, by addressing the "Commissioner of Patents, Washington, D. C."